(12) United States Patent
Gautama et al.

(10) Patent No.: US 9,941,979 B2
(45) Date of Patent: Apr. 10, 2018

(54) TRANSMITTER AND RECEIVER AUDIO DEVICES AND ASSOCIATED METHODS

(71) Applicant: NXP B.V., Eindhoven (NL)

(72) Inventors: Temujin Gautama, Leuven (BE); Nico Ricquier, Leuven (BE)

(73) Assignee: NXP B.V., Eindhoven (NL)

( * ) Notice: Subject to any disclaimer, the term of this patent is extended or adjusted under 35 U.S.C. 154(b) by 75 days.

(21) Appl. No.: 15/062,135

(22) Filed: Mar. 6, 2016

(65) Prior Publication Data
US 2016/0269128 A1 Sep. 15, 2016

(30) Foreign Application Priority Data
Mar. 10, 2015 (EP) ..................................... 15158475

(51) Int. Cl.
*H04B 3/00* (2006.01)
*H04B 11/00* (2006.01)
(Continued)

(52) U.S. Cl.
CPC .............. *H04B 11/00* (2013.01); *H04R 3/00* (2013.01); *H04R 3/12* (2013.01); *H04S 7/301* (2013.01); *H04R 2430/01* (2013.01)

(58) Field of Classification Search
CPC ........ H04R 2201/023; H04R 2201/405; H04R 2420/07; H04R 3/00; H04R 3/005;
(Continued)

(56) References Cited

U.S. PATENT DOCUMENTS

| | | | | |
|---|---|---|---|---|
| 4,068,093 A * | 1/1978 | Fidi | ........................... | H04S 5/00 367/128 |
| 5,471,254 A * | 11/1995 | Claassen | .................. | G09F 23/00 348/734 |
| 6,433,689 B1 * | 8/2002 | Hovind | .............. | G06Q 10/0833 340/10.2 |
| 7,109,789 B2 * | 9/2006 | Spencer | ................ | H03F 3/2171 330/10 |

(Continued)

FOREIGN PATENT DOCUMENTS

GB 2 228 324 A 8/1990

OTHER PUBLICATIONS

Extended European Search Report for Application No. 15158475.2 (dated Sep. 16, 2015).

*Primary Examiner* — Lao Lun-See

(57) ABSTRACT

A receiver-audio-device and a transmitter-audio-device. The receiver-audio-device comprises a receiver-ultrasound-receiver, configured to receive transmitter-ultrasound-signals representative of a request, from a transmitter-audio-device, for complementary audio resources; and a receiver-processor, configured to generate a complementary-audio-output-signal based on at least the transmitter-ultrasound-signals and to provide the complementary-audio-output-signal to a receiver-loudspeaker. The receiver-loudspeaker is configured to provide a complementary-audio-output based on the complementary-audio-output-signal. The transmitter-audio-device, comprising: a transmitter-ultrasound-transmitter, configured to provide transmitter-ultrasound-signals representative of a request for complementary audio resources; a transmitter processor, configured to generate an audio-output-signal and to provide the audio-output-signal to a transmitter-loudspeaker. The transmitter-loudspeaker is configured to provide an audio-output based on the audio-output-signal.

15 Claims, 2 Drawing Sheets

(51) Int. Cl.
*H04R 3/12* (2006.01)
*H04S 7/00* (2006.01)
*H04R 3/00* (2006.01)

(58) Field of Classification Search
CPC . H04R 3/12; H04R 1/026; H04R 1/08; H04R 1/1041; H04R 1/326; H04R 1/40; H04R 1/403; H04R 1/406; H04R 2201/003; H04W 4/02; H04W 4/021; H04W 4/22; H04W 4/12; H04W 4/028; H04W 4/04; H04W 4/06; H04W 76/007; H04W 40/023; H04W 4/008; H04S 7/301; H04S 2400/11; H04S 7/302; H04S 7/303
USPC .... 381/1–4, 17, 77, 79, 56–58, 303; 455/73, 455/78, 90.3
See application file for complete search history.

(56) References Cited

U.S. PATENT DOCUMENTS

| | | |
|---|---|---|
| 8,502,648 B2 | 8/2013 | Gude et al. |
| 2003/0149874 A1* | 8/2003 | Balfanz ............... H04L 63/0492 713/168 |
| 2013/0171930 A1 | 7/2013 | Anand et al. |
| 2013/0322674 A1* | 12/2013 | Ren ........................ H04S 7/303 381/337 |
| 2014/0094944 A1* | 4/2014 | Morcelli ............ H04N 21/4126 700/94 |
| 2014/0362995 A1* | 12/2014 | Backman ................ H04S 7/301 381/17 |
| 2015/0163616 A1* | 6/2015 | Chatterjee ............... H04S 7/301 381/303 |

* cited by examiner

TRANSMITTER AND RECEIVER AUDIO DEVICES AND ASSOCIATED METHODS

CROSS-REFERENCE TO RELATED APPLICATIONS

This application claims the priority under 35 U.S.C. § 119 of European patent application no. 15158475.2, filed Mar. 10, 2015 the contents of which are incorporated by reference herein.

The present disclosure relates to transmitter and receiver audio devices, and associated methods of operation.

Audio devices may have limited quality audio reproduction capabilities, especially where an audio device is small, mobile, and powered by a limited power source such as a battery. The present disclosure relates to means by which such audio devices may be configured to provide for improved audio reproduction by co-ordinating audio output with one or more nearby audio devices.

According to a first aspect there may be provided a receiver-audio-device, comprising: a receiver-ultrasound-receiver, configured to receive transmitter-ultrasound-signals representative of a request, from a transmitter-audio-device, for complementary audio resources; and a receiver-processor, configured to generate a complementary-audio-output-signal based on at least the transmitter-ultrasound-signals and to provide the complementary-audio-output-signal to a receiver-loudspeaker; wherein the receiver-loudspeaker is configured to provide a complementary-audio-output based on the complementary-audio-output-signal.

A complementary-audio-output provided by a receiver-audio-device may improve the quality of audio reproduction provided by a transmitter-audio-device, particularly if the transmitter-audio-device is a mobile device with limited audio reproduction capabilities. The use of ultrasound signalling to make a request for complementary audio resources may enable such requests to be made with very low power consumption, thereby enabling such requests to be made or received on a periodic or even continuous basis, without significantly increasing the power consumption of either a transmitter-audio-device or a receiver-audio-device.

The transmitter-ultrasound-signals may be representative of an audio source and/or information representative of requested audio processing for providing the complementary-audio-output.

An audio-source-signal-receiver may be configured to receive an audio source from a communication channel or a memory, the audio source for providing the complementary-audio-output.

The transmitter-ultrasound-signals may comprise information representative of audio reproduction requested by the transmitter-audio-device. The receiver-processor may be configured to provide the complementary-audio-output-signal by one or more of: filtering the audio source based on the audio reproduction requested by the transmitter-audio-device; selecting one or more channels of the audio source based on the audio reproduction requested by the transmitter-audio-device; and amplifying the audio source to a particular volume level based on the audio reproduction requested by the transmitter-audio-device.

Filtering of the audio source may be based on the audio reproduction capabilities of a receiver-audio-device. For example, where a receiver-audio-device has good low frequency performance, the audio source may be filtered to provide only the low frequency components of the audio source for reproduction by the receiver-audio-device.

The transmitter-ultrasound-signals may be representative of a spatial location of the transmitter-audio-device. The receiver-audio-device may be configured to provide delayed complementary-audio-output based on the spatial location of the transmitter-audio-device and a spatial location of the receiver-audio-device.

The receiver-loudspeaker may be the receiver-ultrasound-receiver.

A receiver-ultrasound-transmitter may be configured to provide receiver-ultrasound-signalling representative of the receiver-audio-device.

According to a further aspect there may be provided transmitter-audio-device, comprising: a transmitter-ultrasound-transmitter, configured to provide transmitter-ultrasound-signals representative of a request for complementary audio resources; a transmitter-processor, configured to generate an audio-output-signal and to provide the audio-output-signal to a transmitter-loudspeaker; wherein the transmitter-loudspeaker may be configured to provide an audio-output based on the audio-output-signal.

The transmitter-ultrasound-signals may comprise an audio source and/or information representative of audio reproduction requested by the transmitter-audio-device.

The transmitter-ultrasound-receiver may be configured to receive one or more receiver-ultrasound-signals representative of audio capabilities of a one or more receiver-audio-devices. The transmitter-audio device may further comprise a processor configured to: determine if the one or more receiver-ultrasound-signals are representative of audio capabilities that may be used to enhance the quality of audio reproduction; and generate an adapted-transmitter-audio-loudspeaker-signal based on the one or more receiver-ultrasound-signals.

The transmitter-ultrasound-receiver may be configured to receive receiver-ultrasound-signals representative of a receiver-audio-device with complementary audio resources. The transmitter-audio device may further comprise a processor configured to: set a transmitter-device-compatibility-indicator if the receiver-ultrasound-signals satisfy a transmitter-device-compatibility-criterion; and when the transmitter-device-compatibility-indicator is set, generate an adapted-transmitter-audio-loudspeaker-signal based on the satisfied transmitter-device-compatibility-criterion. The adapted-transmitter-audio-loudspeaker-signal may be configured to cause the transmitter-loudspeaker to provide an adapted-audio-output.

The transmitter-ultrasound-signals may comprise information representative of audio reproduction requested by the transmitter-audio-device. The transmitter-processor may be configured to provide the adapted-transmitter-audio-loudspeaker-signal by one or more of: filtering an audio source based on the audio reproduction requested by the transmitter-audio-device; selecting one or more channels of an audio source based on the audio reproduction requested by the transmitter-audio-device; amplifying an audio source to a particular volume level based on the audio reproduction requested by the transmitter-audio-device; and delaying an audio source based on a relative position of the transmitter-audio-device and the receiver-audio-device.

The transmitter-ultrasound-receiver may be configured to receive a plurality of receiver-ultrasound-signals representative of a respective plurality of receiver-audio-devices with complementary audio resources. The processor may be configured to set a plurality of transmitter-device-compatibility-indicators based on the plurality of receiver-ultrasound-signals and a plurality of transmitter-device-compatibility-criteria; and when the one or more transmitter-devicecompatibility-indicators are set, the processor may be further configured to: generate one or more transmitter-ultrasound-signals representative of complementary-audio-output for one or more of the plurality of receiver-audio-devices; and generate an adapted-transmitter-audio-loudspeaker-signal based on the one or more complementary-transmitter-ultrasound-signals.

The one or more transmitter-ultrasound-signals may be representative of one or more of: an audio source for providing the complementary-audio-output by a respective receiver-audio-device; synchronisation information for co-ordinating provision of the complementary-audio-output by a respective receiver-audio-device; frequency band information for defining the complementary-audio-output for a respective receiver-audio-device; audio channel information for defining the complementary-audio-output for a respective receiver-audio-device; and audio volume level information for defining the complementary-audio-output for a respective receiver-audio-device.

The transmitter-audio-device may be configured to provide radio frequency electromagnetic signalling representative of an audio source for acoustic output by a receiver-audio-device.

According to a further aspect there may be provided a method of operating a receiver-audio-device, the method comprising: receiving transmitter-ultrasound-signals representative of a request, from a transmitter-audio-device, for complementary audio resources; generating a complementary-audio-output-signal based on at least the transmitter-ultrasound-signals; and providing the complementary-audio-output-signal to a receiver-loudspeaker. The method may further comprise providing a complementary-audio-output, from the receiver-loudspeaker, based on the complementary-audio-output-signal.

According to a further aspect there may be provided a method of operating a transmitter-audio-device, the method comprising: providing transmitter-ultrasound-signals representative of a request for complementary audio resources; generating an audio-output-signal; and providing the audio-output-signal to a transmitter-loudspeaker. The method may further comprise providing an audio-output, based on the audio-output-signal, from the transmitter-loudspeaker.

There may be provided an integrated circuit comprising any receiver-audio-device and/or transmitter-audio-device disclosed herein.

There may be provided a portable electronic device comprising any receiver-audio-device and/or transmitter-audio-device disclosed herein.

There may be provided a computer program, which when run on a computer, causes the computer to configure any apparatus, including a circuit, processor, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

Examples will now be described in detail with reference to the accompanying figures, in which:

DETAILED DESCRIPTION

The present disclosure provides a system which consists of a first 'transmitter' device and a second 'receiver' device. The transmitter device contains the desired (primary) audio signal or source (for example, from its memory or from a voice or other communication channel). When the audio capabilities of the transmitter device are too limited to reproduce the audio signal with sufficient audio quality and/or volume (for example, due to limitations of the loudspeaker or amplifier within the device, or due to power consumption limits that are applied in order to extend the battery life of the device), it may be beneficial to request additional sound resources from other audio devices in the vicinity. The transmitter device can do so by sending out a secondary signal by modulating the secondary signal onto a carrier into the ultrasonic frequency region (for example above 18 kHz) and adding it to its audio playback.

The current trend in mobile devices imposes conflicting requirements on audio reproduction systems. On the one hand, acoustical/audible output needs to be very high and with as little distortion as possible (leading to a preference for larger loudspeakers), while on the other hand, there can be a desire to keep the form factor of the loudspeakers and their enclosures to a minimal size, such that the overall design of the device can follow the current miniaturisation trend.

To compensate for the small loudspeakers in some audio devices, external audio reproduction devices can be used to enhance the perceived audio quality. Such external devices can receive the audio signal or source to be broadcast via a wired or wireless connection, and can have better audio capabilities to reproduce the audio signal with higher quality and/or volume.

Figure 1:
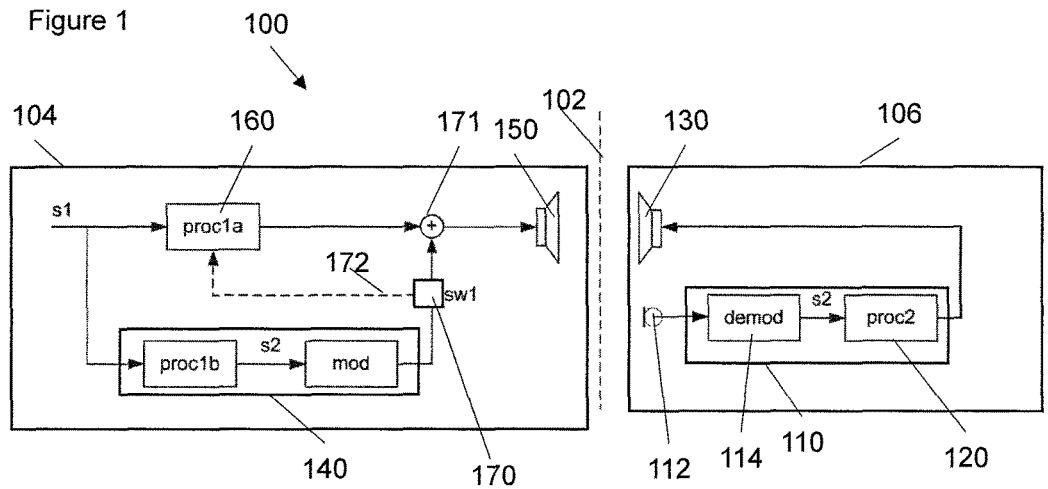
FIG. 1 shows a transmitter-audio-device and a receiver-audio-device configured to co-operate using ultrasound signals.

FIG. 1 shows a schematic diagram of an audio system 100 comprising two audio devices separated by a vertical dotted line 102: a transmitter-audio-device 104 on the left side of the dotted line 102 and a receiver-audio-device 106 on the right side of the dotted line 102.

The receiver-audio-device 106 may comprise a receiver-sensor 112, configured to receive transmitter-ultrasound-signals representative of a request for complementary audio resources, from the transmitter-audio-device 104. The receiver-sensor 112 in this example is a microphone, and may also be referred to as a receiver-ultrasound-receiver. In some examples the receiver-ultrasound-receiver may simply be a terminal/pin of a processor associated with the receiver-audio-device 106, which can be connected to the receiver-sensor 112. It can also be a loudspeaker configured as a microphone, in which case a receiver-loudspeaker 130 can have a dual function (audio playback and ultrasound sensor). In this example, the receiver-audio-device 106 also includes a receiver-ultrasound-processor 110 for processing the transmitter-ultrasound-signals received by the receiver-microphone 112, and providing a receiver-audio-loudspeaker-signal to a receiver-loudspeaker 130. The receiver-loudspeaker 130 may comprise a single loudspeaker or a plurality of loudspeakers.

The receiver-ultrasound-processor 110 in this example includes a demodulation block 114 for recovering a secondary audio signal that has been modulated onto an ultrasonic carrier frequency and broadcast by the transmitter-audio-device 104. The secondary audio signal is an example of request-data that is generated to instruct the receiver-audio-device to complement the audio resources of the transmitter-audio-device by reproducing a secondary audio signal. The secondary audio signal may comprise those parts of a primary audio signal that may advantageously be broadcast by the complementary audio resources, while the primary audio signal is broadcast by the transmitter-audio-device 104. In general, request-data may relate to characteristics of audio reproduction that the transmitter-audio-device 104 cannot adequately provide. For example, the request may relate to audio reproduction in a particular acoustic frequency band, such as bass frequencies, where the transmitter-audio-device 104 has poor bass frequency reproduction capabilities. In the present example the secondary audio signal may consist of a filtered version of the primary audio signal, containing only the components of the primary audio signal below a certain bass-frequency threshold.

The transmitter-ultrasound-signals received at the receiver-sensor 112 can encode a complete audio signal that is to be provided to a user, or may encode a subset of the complete audio signal. For example, the subset may be one or more of a plurality of channels of the complete audio signal, one or more of a plurality of frequency bands of the complete audio signal, etc. In this way, the transmitter-ultrasound-signals can provide an audio source for acoustic output by the receiver-audio-device 106. Furthermore, by modulating the audio source onto an ultrasonic carrier frequency, the transmitter and receiver devices 104, 106 may exchange the necessary audio source information without the need for other hardware components or communications channels.

The receiver-processor 110 can generate the receiver-audio-loudspeaker-signal such that the receiver-loudspeaker 130 provides a complementary-audio-output based on the transmitter-ultrasound-signals. The complementary-audio-output may be complementary inasmuch as it complements audio output from a different device (such as the transmitter-audio-device 104) in order to, together, provide an improved audio output.

In some examples, the complementary-audio-output may be a direct reproduction of the audio source, provided at a particular volume requested by the transmitter-ultrasound-signals. In this way, a small low-power mobile device may request a higher volume of audio output than it is capable of providing itself, such that a user may perceive the audio output at a desired higher volume. Where the receiver-audio-device 106 is capable of providing a higher quality of audio reproduction, the user may also perceive the audio output at a higher fidelity of audio reproduction than would have been possible when the transmitter-audio-device 104, such as a small mobile device, was operating by itself.

The receiver-ultrasound-processor 110 may also comprise components known in the art of audio reproduction, such as amplifiers, tuners, processors or other components required to convert an audio source into a signal capable of providing for an acoustic output by the loudspeaker or loudspeakers.

The transmitter-audio-device 104 may comprise a transmitter-ultrasound-processor 140, configured to provide a transmitter-ultrasound-signal representative of a request for complementary audio resources. As discussed above, this transmitter-ultrasound-signal may simply encode a complete audio signal, or a subset of a complete audio signal. The transmitter-ultrasound-signals may be provided to a transmitter-loudspeaker 150. In this way, the transmitter-loudspeaker 150 is used as a transmitter-ultrasound-transmitter. In some examples, the transmitter-ultrasound-transmitter may simply be a terminal/pin of a processor associated with the transmitter-audio-device 104, which can be connected to the transmitter-loudspeaker 150.

The transmitter-audio-device 104 may further comprise a transmitter-audio-processor 160, configured to provide a transmitter-audio-loudspeaker-signal for the transmitter-loudspeaker 150. The transmitter-audio-processor 160 may comprise any components known in the art of audio reproduction, such as amplifiers, tuners, processors or other components. In this example, the transmitter-audio-device 104 uses a common transmitter-loudspeaker 150 to provide both the audio and the ultrasound broadcasts.

In the example shown in FIG. 1, the transmitter-audio-device 104 comprises an optional switch 170 and an optional summation component 171. An output terminal of the summation component is connected to an input terminal of the transmitter-loudspeaker 150. An output of the transmitter-audio-processor 160 is connected to a first input of the summation component 171. The switch 170 is connected in series between an output of the transmitter-ultrasound-processor 140 and a second input of the summation component 171. In this way, when the switch 170 is closed, the transmitter-ultrasound-signals generated by the transmitter-ultrasound-processor 140 can be selectively added to the transmitter-audio-loudspeaker-signal generated by the transmitter-audio-processor 160 such that the transmitter-loudspeaker 150 can output both signals. The position of the switch 170 can be set in response to user input indicative of a desire to use a third party device to supplement the audio output of the transmitter-audio-device 104.

Also, when the switch 170 is closed such that it provides the transmitter-ultrasound-signals to the transmitter-loudspeaker 150, a control signal 172 can be provided to the transmitter-audio-processor 160. This control signal 172 can cause the transmitter-audio-processor 160 to adapt the transmitter-audio-loudspeaker-signal in accordance with the requested complementary audio resources. In this way, one or more characteristics of the audio output provided by the transmitter-loudspeaker 150 may be adjusted or removed in accordance with an expected audio output of the receiver-audio-device 106. That is, the transmitter-audio-processor 160 may filter the transmitter-audio-loudspeaker-signal such that the subset of the complete audio signal, which is to be broadcast by the receiver-device 106, is not present in an adapted-transmitter-audio-loudspeaker-signal (as discussed below). For example, if the transmitter-audio-device 104 has requested complementary-audio-output comprising low frequencies, then the control signal 172 may configure the transmitter-audio-processor 160 such that the transmitter-audio-loudspeaker-signal causes the transmitter-loudspeaker 150 not to sound output with those low frequencies. In other words, the transmitter-audio-processor 160 can provide only high frequencies to the transmitter-loudspeaker 150. Thereby, the transmitter-audio-device 104 may reduce its energy consumption by only broadcasting a part of the desired audio output while the receiver-audio-device 106 broadcasts the rest of the audio output.

To determine whether the switch 170 should be configured to provide the control signal 172 to the transmitter-audio-processor 160 and to determine what information the control signal 172 should contain, a prior scanning of the receiver-audio-devices in the neighbourhood may be necessary. Known methods can be used for identifying the neighbouring devices (for example, Bluetooth or WiFi).

Alternatively, to determine whether the switch 170 should be configured to provide the control signal 172 to the transmitter-audio-processor 160 and to determine what information the control signal 172 should contain, the transmitter-ultrasound-processor 140 may receive receiver-ultrasound-signals representative of any receiver-audio-device 106 that is configured to provide complementary-audio-output. Further details of such receiver-ultrasound-signals are provided below with reference to FIG. 4. The transmitter-ultrasound-processor 140 can then generate the control signal 172 for the transmitter-audio-processor 160 such that the transmitter-audio-processor 160 provides an adapted-transmitter-audio-loudspeaker-signal. This signal can represent only the sound that is required to be output by the transmitter-loudspeaker 150 given the broadcast of complementary-audio-output by the receiver-audio-device 106. In one example, the receiver-ultrasound-signals may indicate that the receiver-audio-device 106 is capable of providing the low frequency part of the audio signals. In such an example, the control signal 172 can cause the transmitter-audio-processor 160 to provide a transmitter-audio-loudspeaker-signal that does not include the low frequency part of the signals, and the transmitter-ultrasound-signal will be representative of a request to the receiver-device to complement the audio with the low frequency part of the audio signal.

It can be important that the audio signals broadcast simultaneously by the transmitter-audio-device 104 and the receiver-audio-device 106 are temporally aligned. This can be achieved, for example, by including time delays in the signal path of the transmitter-audio-device 104 and/or the signal path of the receiver-audio-device 106 such that the transmitter-audio-loudspeaker-signal for the transmitter-loudspeaker 150 is aligned with the receiver-audio-loudspeaker-signal for the receiver-loudspeaker 130. The transmitter-audio-loudspeaker-signal and the receiver-audio-loudspeaker-signal may be referred to as primary and secondary signals. The audio outputs of the transmitter-audio-device 104 and the receiver-audio-device 106 may therefore be temporally aligned such that they are played synchronously.

In one example, in order to temporally align the audio outputs, the transmitter-audio-device 104 may estimate the time delay between its own broadcast and the arrival of the secondary signal from the receiver-audio-device 106 and adjust the delay between primary signal and modulated secondary signal at its output accordingly.

If a user is located equidistant from the transmitter-audio-device 104 and the receiver-audio-device 106 then simultaneous broadcasts may provide the user with a suitable acoustic experience. In some examples, such as where the transmitter-audio-device 104 is a mobile device, the user may be assumed to be close to the transmitter-audio-device 104. The receiver-audio-device 106 may be assumed to be equidistant from the user if the receiver-audio-device 106 is within a certain predetermined distance from the transmitter-audio-device 104. However, in some examples the receiver-audio-device 106 may be greater than a predetermined distance away from the transmitter-audio-device 104. In such cases, it may be advantageous to introduce a delay into the audio broadcast provided by the transmitter-audio-device 104 such that sound will reach a user's assumed position at an appropriate time to complement sound provided by the transmitter-audio-device 104. That is, the transmitter-audio-loudspeaker-signal and the receiver-audio-loudspeaker-signal may be temporally aligned to compensate for the different acoustical delays from the transmitter-audio-device 104 to the user, from the receiver-audio-device 106 to the user, which may arise from differences in the respective positions of the receiver-audio-106 and transmitter-audio-device 104 devices relative to the user. Various methods may be employed to determine the distance between the transmitter-audio-device 104 and the receiver-audio-device 106 such as time-of-flight analysis of acoustic or ultrasound signalling or any other position determining processing such as GPS.

The transmitter-ultrasound-signal may provide information representative of the spatial location of the transmitter-audio-device 104. The information may provide a specific position, such as where the transmitter-audio-device 104 is equipped with a GPS unit, or may provide ultrasound pulses that may be analysed to determine relative position via a time of flight analysis that may be performed by a receiver-audio-device 106. By determining the relative position of transmitter-audio-device 104 and the receiver-audio-device 106, the audio content broadcast by these devices may be improved. In some examples, the audio channel to be broadcast may be assigned to a particular device based on its position, which may lead to superior stereo or surround sound reproduction. In some examples, the synchronisation of different devices may be modified according to their determined relative positions, with suitable delays introduced into the transmission of different audio signals such that each source may reach the user at a desired time.

A particular embodiment that can be implemented by the audio system 100 of FIG. 1 will now be described in greater detail. The transmitter-audio-device 104 (left-hand side of the dashed line 102) has a primary audio signal ("s1") that has been obtained from memory (such as a music track) or from elsewhere (such as a radio or voice communication channel). If the audio reproduction capabilities of the transmitter-audio-device 104 are limited (by design, or by power consumption limitations), it can be chosen (symbolically represented by the switch "sw1" 170) to process the primary audio signal (by the transmitter-audio-processor 160 labelled "prod1a", which may consist of a filtering or delay operation) and additionally send out a secondary signal ("s2") that is modulated ("mod") onto a carrier that is outside the audio frequency band (for example, using amplitude modulation with a carrier frequency in the ultrasonic frequency region, for example between 18 kHz and 40 kHz). The secondary audio signal may be identical to the primary audio signal, or it may be a portion of the primary audio signal that cannot be reproduced by the audio reproduction system of the transmitter-audio-device 104 (for example, the low-frequency part that cannot be reproduced by small loudspeakers), or a second or other channel if the audio signal is a multi-channel one. The secondary signal is obtained by processing the primary audio signal, s1, with the processing module "prod1b" which is an example component of a transmitter-ultrasound-processor 140. The modulated secondary signal is added to the primary signal by the summation component 171 before being sent to the audio reproduction system of the transmitter-audio-device 104 (shown as a transmitter-loudspeaker 150).

The receiver-audio-device 106 (right-hand side of the dashed line 102) receives the signal from the transmitteraudio-device via an acoustical sensor (represented as a microphone 112). If the receiver-audio-device 106 detects the presence of a secondary signal (for example, by detecting the presence of the carrier that was used by the transmitter-audio-device 104), the secondary signal can be retrieved from the acoustical sensor signal (by amplitude demodulation using a demodulation component 114 for example). The secondary signal can then be sent to the audio reproduction system of the receiver-audio-device 106, in some examples after further processing, which may include filtering and a delay line.

Figure 2:
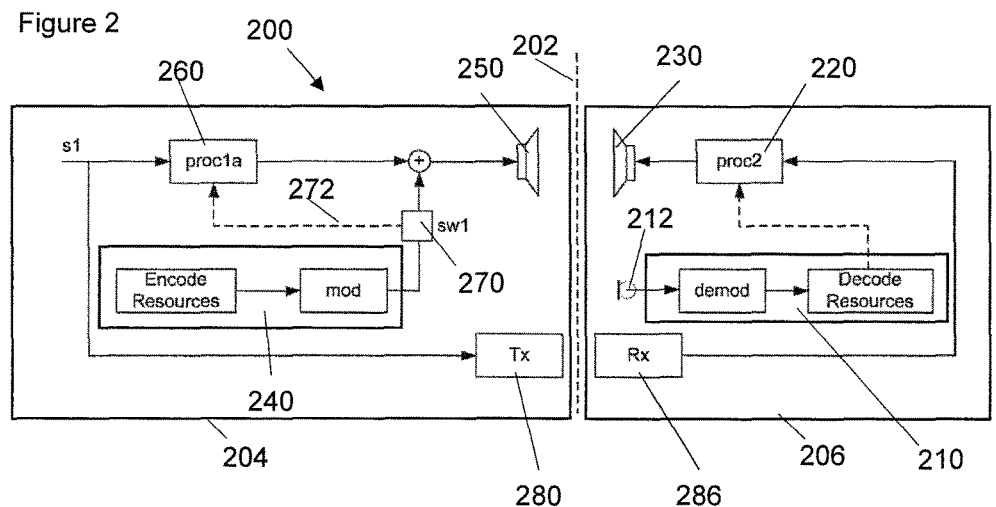
FIG. 2 shows a transmitter-audio-device and a receiver-audio-device configured to co-operate using ultrasound signals and using a dedicated transmitter and receiver.

FIG. 2 shows a further audio system 200, with a transmitter-audio-device 204 on the left-hand and a receiver-audio-device 206 on the right-hand side of a dashed line 202. Features of the audio system 200 that are similar to features of the audio system of FIG. 1 have been given similar reference numerals and may not be discussed further here.

The transmitter-audio-device 204 comprises a transmitter-ultrasound-processor 240 configured to provide transmitter-ultrasound-signals via a switch 270 to a transmitter-loudspeaker 250. The switch 270 of FIG. 2 operates in a similar way to the switch of FIG. 1. The transmitter-ultrasound-signals comprise information representative of complementary audio resources that are requested by the transmitter-audio-device 204 and that may advantageously be employed to improve the audio reproduction performance of the transmitter-audio-device 204. The complementary audio resources may be determined based on known physical characteristics of the transmitter-audio-device 204, such as known limitations that may advantageously be complemented by another device. The transmitter-ultrasound-signals may be received by a receiver-sensor 212 in the receiver-audio-device 206. The receiver-sensor 212 provides received signals to a receiver-resources-processor 210 which determines what resources are being requested by the transmitter-audio-device 204.

The transmitter-audio-device 204 is configured to receive a primary audio signal s1. In this example, the primary audio signal s1 is provided to a dedicated-transmitter 280 within or associated with the transmitter-audio-device 204. The dedicated-transmitter 280 may comprise a radio-frequency or other electromagnetic signal transmitter such as a Bluetooth or Wi-Fi transmitter or any other type of data transmitter known to persons skilled in the art. The dedicated-transmitter 280 may transmit the primary audio signal which may then be received by a dedicated-receiver 286 within or associated with the receiver-audio-device 206.

A receiver-processor 220 receives the primary audio signal from the dedicated-receiver 286 and information from the receiver-resources-processor 210 relating to what resources are being requested. The receiver-processor 220 uses the information from the receiver-resources-processor 210 to determine if the receiver-audio-device 206 has appropriate audio resources to provide complementary audio output. When appropriate audio resources are present, the receiver-processor 220 then processes the primary audio signal to provide a complementary audio signal to a receiver-loudspeaker 230. Thereby, the receiver-audio-device 206 may provide appropriate complementary audio output, to enhance audio reproduction by the transmitter-audio-device 204, when it is appropriate to do so.

Figure 3:
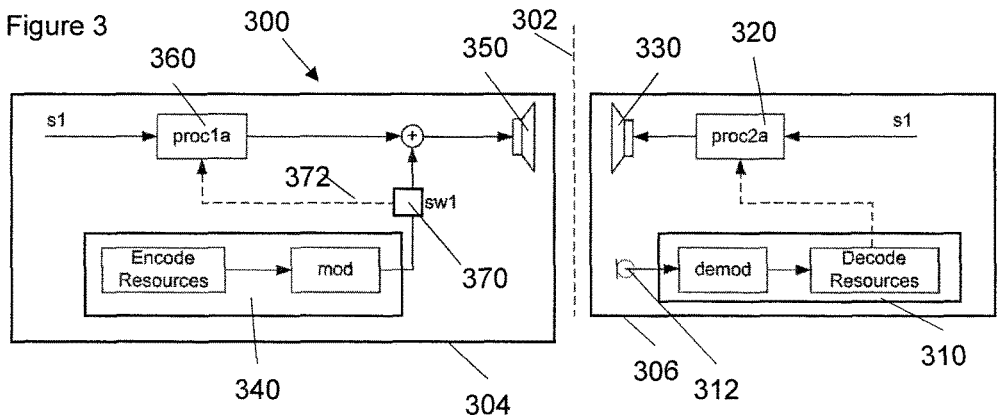
FIG. 3 shows a transmitter-audio-device and a receiver-audio-device configured to co-operate using ultrasound signals and to receive audio content.

FIG. 3 shows a further audio system 300. Features of the audio system 300 that are similar to features of the audio system of FIG. 1 have been given similar reference numerals and may not be discussed further.

The transmitter-audio-device 304 comprises a transmitter-ultrasound-processor 340 configured to provide transmitter-ultrasound-signals, via a switch 370, to a transmitter-loudspeaker 350. The transmitter-audio-device 304 also comprises a transmitter-audio-processor 360 configured to receive an audio source signal and to provide a transmitter-audio-loudspeaker-signal to the transmitter-loudspeaker 350. In this example, the audio source signal is obtained from memory storage or from a broadcast that is available to both the transmitter-audio-device 304 and the receiver-audio-device 306. To enable the receiver-audio-device 306 to correctly identify the appropriate audio source signal, the transmitter-audio-device 304 may provide transmitter-ultrasound-signals that contain identifier-information that identifies a particular audio source, but does not necessarily include the audio source signal itself. The receiver-audio-device 306 may then be able to obtain the audio source signal by any means known to persons skilled in the art using the identifier-information, for example, if the audio source is derived from a radio broadcast, then transmitter-ultrasound-signals may identify the frequency of the broadcast, or if the audio source is available over the internet, the transmitter-ultrasound-signals may identify a file name and uniform resource locator for the audio source. In other examples, the transmitter-ultrasound-signals may identify the file name of a particular audio source stored in memory. The transmitter-ultrasound-signal may identify a temporal offset required for synchronising the audio playback. The amount of data needed to identify the audio source signal may be much smaller than the amount of data that comprises the audio source signal. By using identifying information, the bandwidth of the transmitted-ultrasound-signal may be maintained at a low level.

In some examples, other, higher bandwidth communications systems can instead be used to supply the audio source signal to the receiver-audio-device, as discussed below with reference to FIG. 4.

A particular embodiment that can be implemented by the audio system 300 of FIG. 3 will now be described in greater detail. The primary audio signal, s1, is available on both the transmitter-audio-device 304 and receiver-audio-device 306, because it is derived from, for example, a broadcast or a location on the internet that is accessible to both the transmitter-audio-device 304 and the receiver audio-device 306. The transmitter-ultrasound-processor 340 of the transmitter-audio-device 304 encodes the requested audio resources (for example, determined by its own limited bandwidth, expected volume, number of channels), and modulates ("mod") this (digital) information onto a carrier that is outside the audio frequency band. Other data may be encoded and modulated as well. This signal is added to the processed ("prod1a") version of the primary audio signal. The transmitter-audio-processor 360 "prod1a" and switch 370 "sw1" are similar to those of the embodiment illustrated by FIG. 1. The receiver-audio-device 306 (right-hand side of the dashed vertical line 302) receives the signal via an acoustical sensor 312. If it detects the presence of the carrier that was used in the transmitter-audio-device 304 (which is known to both devices), it demodulates the information on the carrier, and decodes it to determine the audio resources that are requested by the transmitter-audio-device 304. Depending on these resources, and its own resources, appropriate processing can be performed, leading to the control of the receiver-processor 320 "proc2a" in the receiver-audio-device 306. This may be, for example, low-pass filtering to compensate for the poor low-frequency reproduction of the transmitter-audio-device 306. The primary audio signal is processed by the receiver-processor 320 "proc2".

Figure 4:
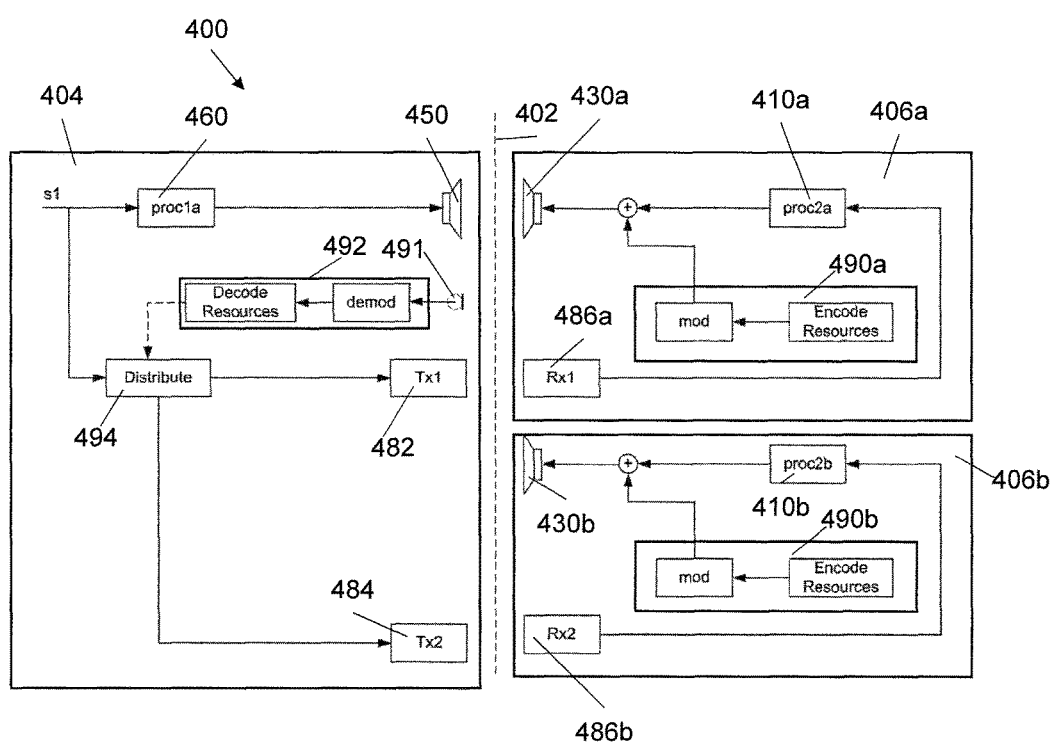
FIG. 4 shows a transmitter-audio-device and a pair of receiver-audio-devices configured to co-operate using ultrasound signals.

FIG. 4 shows a further audio system 400. Features of the audio system 400 that are similar to features of the audio systems of FIG. 1, 2 or 3 have been given similar reference numerals and may not be discussed further here. The audio system 400 of FIG. 4 enables bidirectional transmission of information between a transmitter-audio-device 404 and a plurality of receiver-audio-devices 406a, 406b.

The transmitter-audio-device 404 comprises a transmitter-sensor 491 for receiving a plurality of receiver-ultrasound-signals from a respective plurality of receiver-audio-devices with complementary audio resources. The transmitter-sensor 491 in this example is a microphone. It can also be a loudspeaker configured as a microphone, in which case a transmitter-loudspeaker 450 can have a dual function (audio playback and ultrasound sensor). In this example, transmitter-sensor 491 receives a first receiver-ultrasound-signal from a first receiver-audio-device 406a and receives a second receiver-ultrasound-signal from a second receiver-audio-device 406b. In this way, the transmitter-sensor 491 is used as a transmitter-ultrasound-receiver.

Each receiver-ultrasound-signal may provide receiver-ultrasound-signalling to convey information that is representative of the associated receiver-audio-device, and may include information about its audio reproduction capabilities. For example, the receiver-ultrasound-signals may be representative of one or more of:
  parameters that characterise the capabilities of the receiver-loudspeaker;
  one or more frequency bands that can be provided by the receiver-audio-device;
  one or more audio channels that can be provided by the receiver-audio-device;
  one or more complementary audio volume levels that can be provided by the receiver-audio-device;
  audible/acoustic output that is being provided by the receiver-audio-device; and
  a spatial position of a respective receiver-audio-device.

The receiver-ultrasound-signals may be representative of a possible audio source that the transmitter-device 404 can use to provide an adapted-audio-output (if the receiver-audio-device is used as additional audio resource). Any aspect of the adapted-audio-output may be defined by the receiver-ultrasound-signals such that the transmitter-audio-device 404 can efficiently determine what complementary audio should be reproduced by the receiver-audio-devices to provide an adapted-audio-output that contributes effectively to the overall audio reproduction.

Also, as discussed above, information relating to the spatial position of receiver-audio-devices may enable the transmitter-audio-device to improve its synchronisation with the receiver-audio-devices.

The transmitter-audio-device 404 comprises a transmitter-received-ultrasound-processor 492 configured to process the receiver-ultrasound-signals and set a transmitter-device-compatibility-indicator based on the received receiver-ultrasound-signals and predetermined transmitter-device-compatibility-criteria. The receiver-ultrasound-signals and the predetermined transmitter-device-compatibility-criteria may thereby be used to determine what complementary audio should be reproduced by the receiver-audio-devices to improve the quality of the overall audio reproduction. Thus, the transmitter-received-ultrasound-processor 492 may compare the audio capabilities of the first receiver-audio-device 406a against the audio capabilities of the second receiver-audio-device 406b and with the audio capabilities of the transmitter-audio-device 404 itself. When at least one of the receiver-audio-devices 406a, 406b has superior audio capabilities compared to the transmitter-audio-device 404, as determined based on the comparison of the capabilities of the receiver-audio-devices 406a, 406b with the capabilities of the transmitter-audio-device, then a transmitter-device-compatibility-indicator may be set to indicate which audio components may be best dealt with by which receiver-audio-device 406a, 406b.

The transmitter-audio-device 404 can provide one or more transmitter-ultrasound-signals representative of a request for complementary-audio-output from one or more of the receiver-audio-devices 406a, 406b. Optionally, the transmitter-ultrasound-signals may be provided when a transmitter-device-compatibility-indicator is set. The transmitter-ultrasound-signals may be representative of one or more of:
  an audio source for providing the complementary-audio-output by a respective receiver-audio-device 406a, 406b;
  synchronisation information for co-ordinating provision of the complementary-audio-output by a respective receiver-audio-device 406a, 406b;
  frequency band information for defining the complementary-audio-output for a respective receiver-audio-device 406a, 406b;
  audio channel information for defining the complementary-audio-output for a respective receiver-audio-device 406a, 406b; and
  audio volume level information for defining the complementary-audio-output for a respective receiver-audio-device 406a, 406b.

Thereby, the transmitter-ultrasound-signals may provide sufficiently detailed information to each receiver-audio-device 406a, 406b, such that each receiver-audio-device 406a, 406b can provide an appropriate contribution to the overall audio reproduction required.

The transmitter-ultrasound-signals may be sent to the receiver-audio-devices. In this example, the transmitter-audio-device 404 comprises a distribution block 494 configured to provide the complementary-transmitter-audio-signals to the first audio transmitter 482 and the second audio transmitter 484. It will be appreciated that in other examples a transmitter-audio-device 404 may comprise only a single audio transmitter configured to transmit the primary audio signal to both the first receiver-audio-device 406a and the second receiver-audio-device 406b.

The first and second receiver-audio-devices 406a, 406b may include respective receiver components 486a, 486b for receiving the complementary-transmitter-audio-signal from the transmitter-audio-device 404, and respective receiver-audio-processors 410a, 410b for generating receiver-audio-loudspeaker-signals for the receiver-loudspeakers 430a, 430b. This may be in a similar way to the corresponding features of FIG. 1. In this way, the receiver-loudspeakers 430a, 430b can be used as receiver-ultrasound-transmitters.

Alternatively, the first and second receiver-audio-devices 406a, 406b may include respective receiver components 486a, 486b for receiving the transmitter-audio-signal from the transmitter-audio-device 404, and respective receiver-audio-processors 410a, 410b for generating receiver-audio-loudspeaker-signals for the receiver-loudspeakers 430a, 430b. The receiver-audio-device may further comprise a receiver-sensor and a receiver-resources-processor to determine what resources are being requested by the transmitter-audio-device 404. The receiver-audio-processor 410a, 410b may be adapted according to the resources being requested. In this case, the transmitter-audio-device sends the primary audio signal to its (single) transmitter-audio-transmitter 482, and sends out requests (or assigns) additional resources to the receiver-audio-devices as explained earlier.

The first receiver-audio-device 406*a* comprises a receiver-resources-block 490*a*. The receiver-resources-block 490*a* can provide a first receiver-ultrasound-signal, representative of the audio resources of the first receiver-audio-device 406*a*, to a receiver-loudspeaker 430*a* that is configured to broadcast the first receiver-ultrasound-signal. The receiver-resources-block 490*a* can encode information about the resources of the receiver-audio-device in a similar way to that described above with reference to the transmitter-audio-device of FIG. 3. The second receiver-audio-device 406*b* has similar functionality to the first receiver-audio-device 406*a* and similar features have been given similar reference numerals.

As disclosed above, when a receiver-device-compatibility-indicator is set, a receiver-audio-device may be configured to provide a complementary-audio-output. When a complementary-audio-output is being provided, it may be unnecessary for a transmitter-audio-device to continue to provide its original, complete, audio output.

By exchanging information, using ultrasound signals, between the transmitter-audio-device 404 and each of the first receiver-audio-device 406*a* and the second receiver-audio-device 406*b*, it may be possible to provide superior audio reproduction by using the device with the most suitable audio capabilities to reproduce different parts of some audio content. It will be appreciated that where a plurality of receiver-audio-devices are present, the transmitter-audio-device 404 may be configured to exchange information with each receiver-audio-device and to configure the plurality of receiver-audio-devices so as to provide for improved audio reproduction.

An embodiment of the audio system 400 of FIG. 4 involves transmission of information that is bidirectional. In this embodiment, the transmitter-audio-device 404 gathers encoded data from two receiver-audio-devices 406*a*, 406*b*. The receiver-audio-device 406*a* comprises a receiver-resources-processor 490*a* configured to provide an ultrasound signal representative of the audio reproduction capabilities possessed by the receiver-audio-device 406*a*. The receiver-ultrasound-signals are provided by the receiver-resources-processor 490*a* to a loudspeaker 430*a* which broadcasts the ultrasound signals.

The transmitter-audio-device 404 receives the receiver-ultrasound-signals, broadcast by the receiver-audio-device 406*a*, at a transmitter-received-ultrasound-processor 492, which may be referred to as a resource-receiver block. The transmitter-received-ultrasound-processor 492 decodes the ultrasound signals to determine the audio resources possessed by the receiver-audio-device 406*a*. The transmitter-received-ultrasound-processor 492 may similarly receive and decode audio resource information from a plurality of other receiver-audio-devices. Based on the available resources, the transmitter-audio-device 404 determines a configuration in which the combination of the devices (including the transmitter-audio-device 404) can provide a good perceived audio quality: it 'distributes' the primary audio signal across the different devices (at the "Distribute" block 494). As an example, the low frequencies may be reproduced by the devices with the better low-frequency reproduction, while the other devices may play the higher frequencies, possibly at different volumes. The transmitter-audio-device 404 may detect which receiver-audio-devices 406*a*, 406*b* are available by scanning for the presence of carrier frequencies (on the signal registered with the transmitter-sensor) within a certain frequency region, and may determine the distances to the receiver-audio-devices 406*a*, 406*b* based on cues in the ultrasonic frequency region.

The transmitter-audio-device 404 may generate a plurality of secondary signals (one for each receiver-audio-device 406*a*, 406*b*) and send them to the receiver-audio-devices 406*a*, 406*b*, either via separate transmitters (Tx1 482 and Tx2 484), or via one transmitter (not shown) that sends the different secondary signals to the different receiver-audio-devices 406*a*, 406*b* via a single transmission, or via the playback of modulated versions of the secondary signals on carriers in the ultrasonic frequency or radio frequency spectrum. The receiver-audio-devices 406*a*, 406*b* may receive these secondary signals via dedicated receivers Rx1 486*a*, and Rx2 486*b* using acoustic signalling, ultrasound signalling, radio frequency electromagnetic signalling or any other form of signalling.

Alternatively, the transmitter-audio-device 404 may send the primary audio signal to the receiver-audio-devices 406*a*, 406*b*, via a single transmitter (not shown) that sends the different secondary signals to the different receiver-audio-devices 406*a*, 406*b* via a single transmission. The receiver-audio-devices 406*a*, 406*b* may receive the primary signal via dedicated receivers Rx1 486*a*, and Rx2 486*b* using acoustic signalling, ultrasound signalling, radio frequency electromagnetic signalling or any other form of signalling.

In some examples a transmitter-audio-device 404 may be configured to provide radio frequency (RF) electromagnetic signalling representative of an audio source for acoustic output by a receiver-audio-device 406*a*, 406*b*. The RF signalling may provide for a high bandwidth communication channel between the transmitter-audio-device 404 and a receiver-audio-device 406*a*, 406*b*. Such RF signalling may only be activated when an audio source needs to be transmitted. Thereby, the transmitter-audio-device 404 may be more energy efficient than would otherwise be the case. The ultrasound signalling may typically be conducted with very low power consumption. Therefore, the transmitter-audio-device 404 may permanently monitor the environment for compatible receiver-audio-devices 406*a*, 406*b* at very low energy cost. Then, when such receiver-audio-devices are identified as being available, only activate the RF signalling apparatus to the extent necessary to send the data actually required by a particular receiver-audio-device 406*a*, 406*b* in order to provide improved audio reproduction for a user.

It will be appreciated that many different types of RF signalling apparatus may be used in embodiments of the present disclosure, such as Bluetooth or Wi-Fi or any other RF signalling system known to persons skilled in the art.

It will be appreciated that any components that are described or illustrated herein as being coupled or connected could be directly or indirectly coupled or connected. That is, one or more components could be located between two components that are said to be coupled or connected whilst still enabling the required functionality to be achieved.

One or more audio systems disclosed herein may include: a transmitter device; a receiver device; a processing module in the transmitter device; a processing module in the receiver device; a means for extracting information or a secondary signal in the receiver device (either from an acoustical sensor or from a separate transmission); a means for processing the signal in the receiver device; and optionally, a means for configuring the processing module based on the extracted information.

As discussed above, when a transmitter-audio-device has limited audio reproduction capabilities (by design, for example, small loudspeakers and amplifier, or if it runs on batteries to save on power consumption), it can send a secondary signal to one or several audio devices in the vicinity to enhance the reproduced audio, while the transmitter-audio-device may simultaneously play the primary audio signal.

The receiver-audio-device may be a hearing aid, to which an audio signal is sent (for example, the audio from a speaker during a presentation, or the audio output from a television or a mobile phone).

In some examples a mobile electronic device may comprise the receiver-audio-device and/or the transmitter-audio-device. For example, such mobile electronic devices may include mobile telephones, smart phones, smart watches, tablet computers, laptop computers or any other mobile electronic device with an audio output capability known to persons skilled in the art. Examples of devices that comprise a receiver-audio-device according to embodiments of the present disclosure may further include hi-fi systems, televisions, radios, computers, in-car entertainment systems or any other system capable of providing audio reproduction. Thereby, a suitable equipped device, such as a smartphone, may advantageously utilize the superior audio reproduction capabilities of a nearby hi-fi or in-car entertainment system to provide a user with improved audio reproduction performance compared to what would be possible using the audio capabilities of the smartphone itself.

An external audio reproduction device can be linked to a single 'source' device. The two devices can to be linked to each other (for example, via an audio cable or a Bluetooth pairing). One or more of the examples disclosed herein relate to how the 'source' device may send audio information to an external device without the need to establish a pre-existing link such as a Bluetooth link.

Data may be transmitted using ultrasound. The present disclosure may involve modulation of a secondary signal or other data onto a carrier signal in the ultrasonic frequency region, containing information requesting additional resources for audio playback from any devices sufficiently nearby to receive the ultrasound signal.

The present disclosure relates to a system which consists of a first 'transmitter' device and a second 'receiver' device. The transmitter device may contain the desired (primary) audio signal (for example, from its memory or from a voice communication channel). When the audio capabilities of the transmitter device are too limited to reproduce the audio signal with sufficient audio quality and/or volume (for example, due to limitations of the loudspeaker or amplifier, or due to power consumption limits to extend the battery life of the device), it may be beneficial to request additional sound resources from other audio devices in the vicinity. The transmitter device may do so by sending out a secondary signal.

To improve the quality and/or to increase the volume of the reproduced audio, the transmitter device may use the audio reproduction system of the receiver device (for example, because the latter device has better loudspeakers) to play a secondary audio signal (that may be sent by the transmitter device). This secondary audio signal can either complement or replace the playback of the primary audio signal by the transmitter device. The secondary signal can be equal to the primary audio signal, it can be a filtered version of the primary audio signal, or it can be different from the primary audio signal (for example, one of the channels for multi-channel sound reproduction). The receiver device receives the secondary signal and sends it to its audio reproduction system. The presence of the secondary signal sent by the transmitter device can be interpreted as a request from the transmitter device for additional audio resources.

The present disclosure may relate to several receiver-audio-devices and a single transmitter-audio-device. This may be a useful configuration as an alternative to a conferencing setting, where multiple users may use their own audio reproduction device, rather than one central device. It may be desirable to mute the audio reproduction by the transmitter-audio-device.

The invention claimed is:

1. A receiver-audio-device, comprising:
   a receiver-ultrasound-receiver, configured to receive transmitter-ultrasound-signals representative of a request, from a transmitter-audio-device, for complementary audio resources, wherein the transmitter-ultrasound-signals are representative of an audio source without including the audio source itself; and
   a receiver-processor, configured to generate a complementary-audio-output-signal based on at least the transmitter-ultrasound-signals by signal filtering, audio channel selection or signal amplification and to provide the complementary-audio-output-signal to a receiver-loudspeaker;
   wherein the receiver-loudspeaker is configured to provide a complementary-audio-output based on the complementary-audio-output-signal.

2. The receiver-audio-device of claim 1, wherein the transmitter-ultrasound-signals are further representative of information representative of requested audio reproduction for providing the complementary-audio-output or identifier information that identifies a particular audio source.

3. The receiver-audio-device of claim 1, further comprising an audio-source-signal-receiver configured to receive an audio source from a communication channel or a memory, the audio source for providing the complementary-audio-output.

4. The receiver-audio-device of claim 2, wherein the transmitter-ultrasound-signals comprise information representative of audio reproduction requested by the transmitter-audio-device, and wherein the receiver-processor is configured to provide the complementary-audio-output-signal by one or more of:
   filtering the audio source based on the audio reproduction requested by the transmitter-audio-device;
   selecting one or more channels of the audio source based on the audio reproduction requested by the transmitter-audio-device; and
   amplifying the audio source to a particular volume level based on the audio reproduction requested by the transmitter-audio-device.

5. The receiver-audio-device of claim 1, wherein the transmitter-ultrasound-signals are representative of a spatial location of the transmitter-audio-device and/or a temporal offset of the audio signal, and wherein the receiver-audio-device is configured to provide delayed complementary-audio-output based on the spatial location of the transmitter-audio-device and a spatial location of the receiver-audio-device.

6. The receiver-audio-device of claim 1, wherein the receiver-loudspeaker is the receiver-ultrasound-receiver.

7. The receiver-audio-device of claim 1, further comprising a receiver-ultrasound-transmitter configured to provide receiver-ultrasound signaling representative of the receiver-audio-device.

8. A transmitter-audio-device, comprising:
   a transmitter-ultrasound-transmitter, configured to provide transmitter-ultrasound-signals representative of a request for complementary audio resources, wherein the transmitter-ultrasound-signals are representative of an audio source without including the audio source itself;

a transmitter-processor, configured to generate an audio-output-signal by signal filtering, audio channel selection or signal amplification and to provide the audio-output-signal to a transmitter-loudspeaker;

wherein the transmitter-loudspeaker is configured to provide an audio-output based on the audio-output-signal.

9. The transmitter-audio-device of claim 8, wherein the transmitter-ultrasound-signals further comprise information representative of audio reproduction requested by the transmitter-audio-device or identifier information.

10. The transmitter-audio-device of claim 8, further comprising:

a transmitter-ultrasound-receiver configured to receive one or more receiver-ultrasound-signals representative of audio capabilities of a one or more receiver-audio-devices;

the transmitter-audio device further comprising a processor configured to:
  determine if the one or more receiver-ultrasound-signals are representative of audio capabilities that may be used to enhance the quality of audio reproduction; and
  generate an adapted-transmitter-audio-loudspeaker-signal based on the one or more receiver-ultrasound-signals.

11. The transmitter-audio-device of claim 8, further comprising:

a transmitter-ultrasound-receiver configured to receive receiver-ultrasound-signals representative of a receiver-audio-device with complementary audio resources;

the transmitter-audio device further comprising a processor configured to:
  set a transmitter-device-compatibility-indicator if the receiver-ultrasound-signals satisfy a transmitter-device-compatibility-criterion; and
  when the transmitter-device-compatibility-indicator is set, generate an adapted-transmitter-audio-loudspeaker-signal based on the satisfied transmitter-device-compatibility-criterion, wherein the adapted-transmitter-audio-loudspeaker-signal is configured to cause the transmitter-loudspeaker to provide an adapted-audio-output.

12. The transmitter-audio-device of claim 8, wherein the transmitter-ultrasound-signals comprise information representative of audio reproduction requested by the transmitter-audio-device, and wherein the transmitter-processor is configured to provide the adapted-transmitter-audio-loudspeaker-signal by one or more of:

filtering an audio source based on the audio reproduction requested by the transmitter-audio-device;

selecting one or more channels of an audio source based on the audio reproduction requested by the transmitter-audio-device;

amplifying an audio source to a particular volume level based on the audio reproduction requested by the transmitter-audio-device; and delaying an audio source based on a relative position of the transmitter-audio-device and the receiver-audio-device.

13. The transmitter-audio-device of claim 9, wherein:

the transmitter-ultrasound-receiver is configured to receive a plurality of receiver-ultrasound-signals representative of a respective plurality of receiver-audio-devices with complementary audio resources;

the processor is configured to set a plurality of transmitter-device-compatibility-indicators based on the plurality of receiver-ultrasound-signals and a plurality of transmitter-device-compatibility-criteria; and when the one or more transmitter-device-compatibility-indicators are set, the processor is further configured to:
  generate one or more transmitter-ultrasound-signals representative of complementary-audio-output for one or more of the plurality of receiver-audio-devices; and
  generate an adapted-transmitter-audio-loudspeaker-signal based on the one or more complementary-transmitter-ultrasound-signals.

14. The transmitter-audio-device of claim 8, wherein the transmitter-ultrasound-signals are representative of one or more of:

an audio source for providing the complementary-audio-output by a respective receiver-audio-device;

identifier information for co-ordinating provision of the complementary-audio-output by a respective receiver-audio-device;

frequency band information for defining the complementary-audio-output for a respective receiver-audio-device;

audio channel information for defining the complementary-audio-output for a respective receiver-audio-device; and audio volume level information for defining the complementary-audio-output for a respective receiver-audio-device.

15. The transmitter-audio-device of claim 10, configured to provide radio frequency electromagnetic signaling representative of an audio source for acoustic output by a receiver-audio-device.

* * * * *